United States Patent Office 3,692,611
Patented Sept. 19, 1972

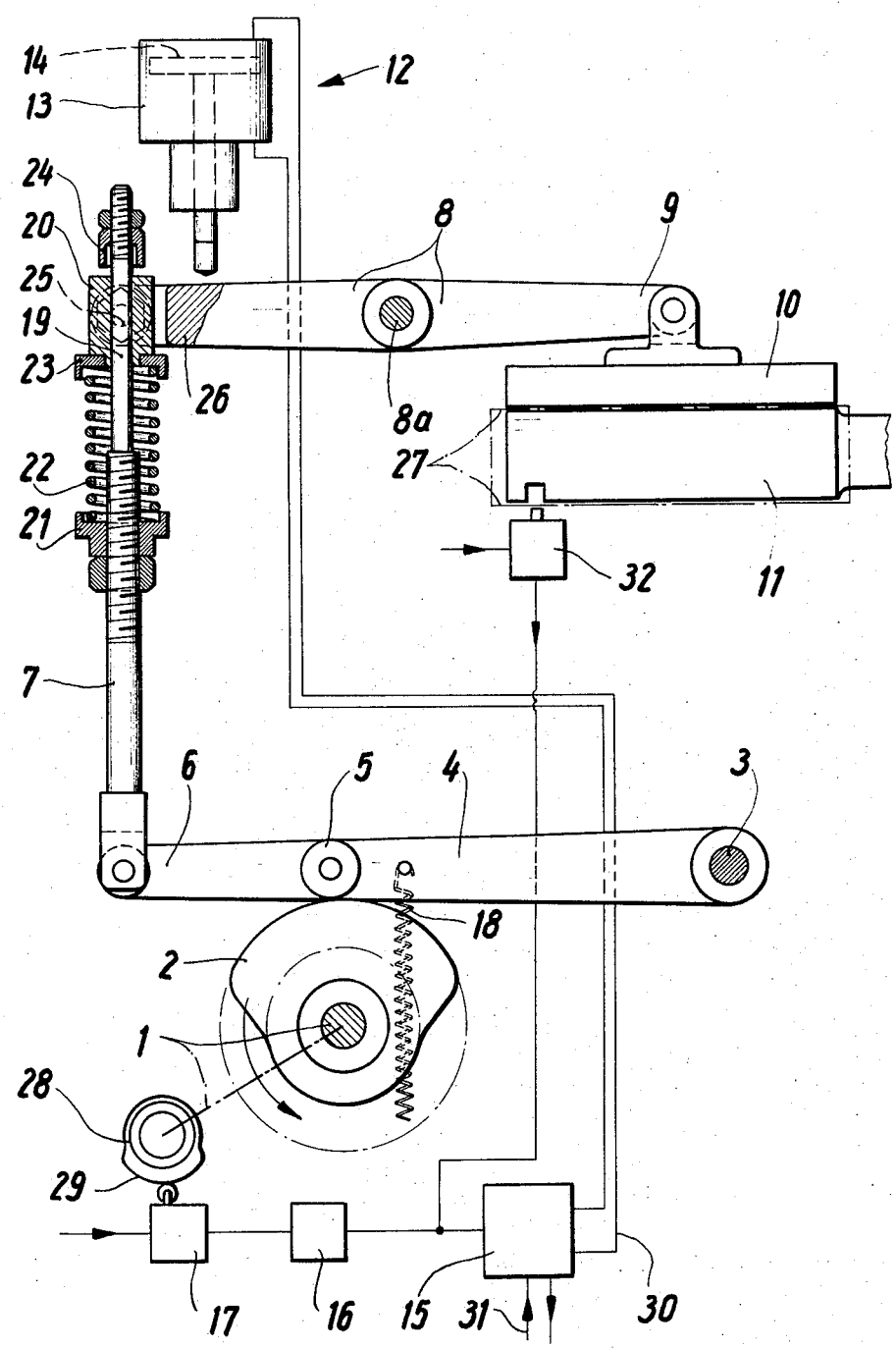

3,692,611
HEAT SEAL TOOL
Paul Kühnle, Winnenden, Germany, assignor to Fr. Hesser Maschinenfabrik AG, Stuttgart-Bad Cannstatt, Germany
Filed Dec. 28, 1970, Ser. No. 101,618
Int. Cl. B30b 15/34; G05g 15/00
U.S. Cl. 156—358                    8 Claims

ABSTRACT OF THE DISCLOSURE

A heat sealing arrangement in a packaging machine, in which a mechanical drive sequentially operates the heat seal tool in correlation with the speed of the machine. A pneumatic or electric control mechanism, including a delay switch, is arranged to intercede in the sealing or welding operation and movement of heat seal tool when the drive is slowed down or interrupted, in order to complete the sealing step.

---

This invention relates generally to a packaging machine and, more particularly, to a tooling arrangement thereof for heat sealing or welding a seam of foil material having a thermoplastic layer and is adapted for use in making packaging containers such as bags and similar articles.

It is already known in packaging equipment to actuate heat seal or welding tools by means of cams which are operated and controlled by a linkage system. In such devices, when the r.p.m. of the cam is changed a corresponding change occurs in the time for operating the heat seal mechanism. In packaging machines which utilize such heat sealing arrangements it is, however, very often desirable or necessary to drive such machines at a reduced speed. As a result, the r.p.m. of the cam controlling the movement of the heat seal tool is also slowed down which frequently causes burning or scorching of the heat seal or welding seam.

Conventional heat seal tools are driven by pneumatic cylinders, the supply of air pressure to the pneumatic cylinders being controlled by means of magnetic valves. The duration of current supply to the magnetic valves is controlled by electric time switches. In such arrangements the operating time of the heat seal tool is independent of the prevailing speed of the machine, provided the time switch has not been changed; however, it is well known that pneumatic drives are disadvantageously affected by pressure variations in the air pressure supply and possibly changing frictional resistance, which results in an uneven work speed. Particularly when the heat seal tool operates at a very rapid rate, the seams are established with unequal configuration and construction.

Further, lifting devices for the heat seal tools are known in which at the time when the packaging machine is turned off the lifter immediately guides the heat seal tools to their initial position. However, it can happen that the machine is turned off when the seam or packaging containers are only partly completed. Prior to renewed operation of the machine it becomes necessary to remove the defective seams of such packaging containers by hand.

An aspect of the present invention resides in the provision of a heat seal arrangement in which a cam mounted on a rotating cam shaft is effective to open and close at least one heat seal tool. A delay switch with a preselected operating time is responsive to rotation of the cam is associated with a device for opening the heat seal tool, in such a manner to assure that the opening or release of the heat seal tool occurs at the latest after the pre-selected time period of the delay switch has elapsed.

The particular device for selectively opening the heat seal tool comprises, preferably, a cylinder having a work piston which is connected to an air pressure conduit with a control valve interposed therebetween. The control valve is operated by the delay switch.

In accordance with another aspect of the present invention, there is provided in the heat seal arrangement a spring which limits the operating pressure of the heat seal tool. The spring is related to the cylinder in such a manner that the effect of the spring can be lifted by means of the work piston.

It is therefore the primary object of the present invention to provide a heat seal arrangement which will complete the desired seam independent of whether its mechanical drive is operated at reduced speed, or is turned off altogether, during the heat seal process, by maintaining the heat seal tool for a pre-determined period in its working position. As a result, burned, scorched or unfinished seams are prevented.

For a better understanding of the present invention, together with other and further objects thereof, reference is had to the following description taken in connection with the accompanying drawings, and its scope will be pointed out in the appended claims.

In the drawing:

The single figure is a generally schematic, and in part diagrammatic, illustration of the heat seal arrangement in accordance with the invention.

Referring now to the drawing, there is shown a rotating cam shaft 1, driven by a motor, not shown, and carrying a cam 2. The r.p.m. of the drive motor may be adjustable in such a manner that the packaging machine, which is not illustrated, and of which the heat seal arrangement forms a part, can be operated during the starting or tooling at a rate lower than the normal or rated speed.

In rolling engagement with the cam surface of the cam 2 is a cam follower or roller 5 rotatably mounted to a lever 4 which at one end 6 is pivotably secured to a shaft 3 and at the opposite end 6 the lever is pivotably linked to a rod 7.

A double arm lever 8 pivotably mounted about a pin 8a carries pivotably at one end 9 a heat seal tool 10 which includes a counter tool 11. The latter forms a forming mandrel which together with other forming mandrels are secured in a conventional manner, spaced, on a wheel (also not shown) rotating around a vertical axis; the other arm of the lever 8 is associated with an actuating and control arrangement 12 effective for opening the tools 11, 12 whenever called for. Essentially, the actuating and control arrangement comprises a cylinder 13 carrying a reciprocating piston 14 for engagement with lever 8 and actuating controls including delay switch 16 and switch 17.

The lever 4 is caused to move about the axis of shaft 3 when the shaft 1 rotates and the cam surface 2 bears against the cam follower 5 and against the bias of compression spring 18, which acts against the lever 4. The rod 7 is slidably mounted for longitudinal movement with its second end 19 in a bushing 20. On the center part of the rod 7 there is arranged a sleeve 21 against which abuts a compression spring 22. The compression spring 22 is supported with its other end against a sleeve abutment 23 which in turn engages the bushing 20. At the free end of the rod 7 there is provided an adjustable detent or abutment 24, which prevents the rod 7 from leaving the bushing 20 due to the bias of compression spring 22. The bushing 20 pivotably connects by means of two bolts 25 to the free end 26 of the lever 8. The rod 7 is moved in accordance with the angular path which is made by the end 6 of the elever 4. Due to such movement the sleeve 21 pressures the compression spring 22 against bushing 20, in such a manner, so that the end 9 of the lever 8 presses the heat seal tool 10 against the counter tool 11.

In operation, there is placed between the tools 10 and 11 a thermoplastic foil 27 or a thermoplastic packing material having a layer of thermoplastic material which, when suitably affected by heat and pressure from the tools 10, 11, establishes a weld or heat seal seam.

The return stroke of the lever 4, and that of the rod 7, causes the compression spring 22 first to relax to such an extent until the detent 24 abuts against the bushing 20 and prevents a further displacement of the rod 7 therein. During the subsequent sequence of the return stroke of the lever 4 and of the rod 7, the heat seal tool 10 and counter tool 11 is sufficiently opened for removal of the packing material 27.

The actuation of the switch 17 occurs in such a manner that the same provides a signal during the operating cycle of the heat seal arrangement at a point when the heat seat tool 10 is pressured against or towards the counter tool 11. The signal of switch 17 is continued, suitably, for a sufficient length of time necessary to establish the heat seal, taking into consideration the rated speed of the sealing process and the time required to accomplish this task. For this purpose, there may be provided a companion cam 28 whose cam surface is arranged with a similar configuration and angle of rotation as that of the cam 2 and whose rotation is synchronized therewith.

When the switch 17 gives a signal the same is transmitted to a control valve 15 only after a period of time has elapsed which has been pre-determined by the delay switch 16. This period of time is adjusted as slightly longer than the period required for the heat seal step of the device at rated speed. If, for some reason, the rotation of the shaft 1 is delayed or, perhaps, interrupted, the delay switch 16 will actuate the control valve 15 after the pre-determined period of the delay switch 16 has expired. Thereby, a conduit 30, which leads to the cylinder 13, is connected with an air pressure conduit 31, which causes the work piston 14 to be biased so that the end 26 of the lever 8 is moved against the force of the compression spring 22 and overcomes its bias. As a result, the heat seal tool 10 is moved away from the counter tool 11. The delayed rotation of the cam shaft 1 may, as already indicated, be caused by a drive with a reduced r.p.m. for the purpose of adjusting a packaging machine. An interference or interruption of the rotation of the shaft 1 occurs each time the packaging machine is turned off.

The switch 17 and the delay switch 16 may, in a known manner, be formed as pneumatic or electric switch elements. Correspondingly, the control valve 15 is then actuated either pneumatically or electromagnetically.

Inasmuch as it may be advantageous to actuate only the heat seal tool 10 when the packaging material 27 is located between the tool 10 and the counter tool 11, a sensor 32 may be provided which may, in a given case, actuate the control valve 15 and thereby effect an actuation of the work piston 14 in the direction of the end 26 of lever 8.

The need for the compression spring 22 may be obviated by incorporating the cylinder 13 and the work piston 14 into the mechanical drive 2, 4, 7 in such a manner that the stroke of the work piston 14 is superimposed over the cam 2. In this case, it may be desirable to select a cylinder construction effective for accommodating a double acting work piston. The conduits which lead to the cylinder and which cause the movement of the heat seal tools 10, 11 are then equipped with a pressure reducing valve and a safety valve for placing an upper limit upon pressure which is to be applied.

As noted, it is possible by means of the described arrangement to limit the time period during which pressure is applied upon the heat seal tool 10 to a pre-determined period, regardless of whether the mechanical drive 2, 4, 7 in the arrangement is working at a reduced speed or, for some reason, is turned off during the heat seal process. Once the seam working step has begun, the seam will be completed so that it is not necessary to remove the packages with defective seams out of the packaging machine. When the device is driven at the rated speed and capacity, no time pressure variations upon the tools are experienced due to the arrangement of the mechanical drive 2, 4, 7. As a result of the unique controls, air pressure is utilized in exceptional cases only as compared to a conventional pneumatically actuated heat seal arrangement. The noise level is thereby reduced to a minimum.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. In a machine for making packages and having a heat seal arrangement for welding or heat sealing a seam in the packages, comprising:
    a movable heat seal tool; mechanical drive means including cam means connecting to said tool for moving the tool in a sequence corresponding to the normal operating speed of the packaging machine; and control means for affecting the movement of said heat seal tool upon a deviation of said normal operating speed, said control means including a time delay switch having a pre-determined operating time period and being operatively associated with said cam means, and actuating means responsive to signals from said switch and effective to move and open said heat seal tool at the latest after said pre-determined operating time period has elapsed.

2. In a machine according to claim 1, wherein said delay switch is pneumatically responsive.

3. In a machine according to claim 1, wherein said delay switch is electrically responsive.

4. In a machine according to claim 1, wherein said actuating means includes a cylinder having a reciprocating piston therein; an air pressure conduit connecting to said cylinder; and a control valve in said conduit responsive to said delay switch.

5. In a machine according to claim 4, wherein said mechanical drive means includes a compression spring for biasing said heat seal tool; and wherein said cylinder and piston is effective to selectively disable the bias of said spring against said tool.

6. In a machine according to claim 4, wherein said cylinder and said piston therein are arranged to provide a stroke corresponding to that of said cam means.

7. In a machine according to claim 4, wherein said conduit includes a pressure reducing valve and a safety valve.

8. In a machine according to claim 4, and a sensor associated with said tool and said control valve for determining the presence of a workpiece.

References Cited
UNITED STATES PATENTS

| | | | |
|---|---|---|---|
| 1,875,975 | 9/1932 | Alm | 100—93 P |
| 2,433,176 | 12/1947 | Van Epps et al. | 156—358 |
| 2,766,810 | 10/1956 | Gibson | 156—366 X |
| 2,884,988 | 5/1959 | D'Angelo | 156—583 X |
| 2,958,368 | 11/1960 | Dreeben | 100—93 P |
| 3,015,601 | 1/1962 | Fener | 156—583 X |
| 3,348,474 | 10/1967 | Virta et al. | 156—583 X |
| 3,494,816 | 2/1970 | Fener | 156—359 |
| 3,657,055 | 4/1972 | Nichols | 156—583 |

ROBERT F. BURNETT, Primary Examiner

J. C. GIL, Assistant Examiner

U.S. Cl. X.R.

100—93 P; 156—359, 366, 367, 583